United States Patent
Chi et al.

(10) Patent No.: US 7,734,309 B2
(45) Date of Patent: Jun. 8, 2010

(54) POWER CONTROL AVOIDING OUTER LOOP WIND-UP

(75) Inventors: Richard Chi, Santa Clara, CA (US);
Da-Shan Shiu, San Jose, CA (US); Nitin Kasturi, Los Gatos, CA (US);
Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/750,938

(22) Filed: May 18, 2007

(65) Prior Publication Data

US 2007/0218935 A1    Sep. 20, 2007

Related U.S. Application Data

(60) Division of application No. 11/264,950, filed on Nov. 1, 2005, and a continuation of application No. 10/067,608, filed on Feb. 4, 2002, now Pat. No. 7,010,321.

(51) Int. Cl.
*H04Q 7/20*    (2006.01)
(52) U.S. Cl. ........................................ 455/522; 370/318
(58) Field of Classification Search ................. 455/522, 455/68, 69, 70, 67.11, 67.13, 422.1, 13.4; 370/318
See application file for complete search history.

(56) References Cited

U.S. PATENT DOCUMENTS

| | | | |
|---|---|---|---|
| 6,163,705 A | 12/2000 | Miya | |
| 6,212,364 B1 | 4/2001 | Park | |
| 6,334,047 B1 | 12/2001 | Andersson et al. | |
| 6,373,823 B1 | 4/2002 | Chen et al. | |
| 6,385,437 B1 * | 5/2002 | Park et al. | 455/69 |
| 6,405,052 B1 | 6/2002 | Faber | |
| 6,414,946 B1 | 7/2002 | Satou et al. | |
| 6,434,124 B1 * | 8/2002 | Rege | 370/311 |
| 6,493,541 B1 * | 12/2002 | Gunnarsson et al. | 455/69 |
| 6,498,785 B1 | 12/2002 | Derryberry et al. | |
| 6,556,839 B1 | 4/2003 | Kondo | |
| 6,600,772 B1 | 7/2003 | Zeira et al. | |
| 6,603,746 B1 * | 8/2003 | Larijani et al. | 370/318 |
| 6,606,496 B1 | 8/2003 | Salvarani et al. | |
| 6,628,924 B1 | 9/2003 | Miyamoto | |
| 6,697,634 B1 | 2/2004 | Hayashi | |
| 6,823,194 B2 * | 11/2004 | Haim | 455/522 |
| 6,940,894 B2 * | 9/2005 | Sendonaris | 375/140 |
| 6,965,780 B1 * | 11/2005 | Monogioudis et al. | 455/522 |
| 6,968,201 B1 | 11/2005 | Gandhi et al. | |
| 6,983,165 B1 * | 1/2006 | Hiramatsu | 455/522 |
| 7,058,028 B1 * | 6/2006 | Holma et al. | 370/318 |
| 7,069,035 B2 * | 6/2006 | Chen et al. | 455/522 |
| 7,254,413 B2 | 8/2007 | Muller et al. | |
| 2001/0008524 A1 | 7/2001 | Ishii et al. | |

(Continued)

*Primary Examiner*—CongVan Tran
(74) *Attorney, Agent, or Firm*—Howard Seo

(57) ABSTRACT

Techniques for power control that avoids outer loop wind-up are disclosed. In one aspect, wind-up of a target power level is detected, and the target power level is modified in response. In another aspect, unwinding of the target power level is detected, after which the target power level is determined without considering wind-up. Various other aspects are also presented, including wind-up and unwinding detection procedures, and target power level modification procedures. These aspects have the benefit of reducing the time that transmit power exceeds that which is necessary, thus increasing system capacity and performance, and mitigating misallocation of system resources.

27 Claims, 6 Drawing Sheets

U.S. PATENT DOCUMENTS

| | | |
|---|---|---|
| 2001/0029189 A1 | 10/2001 | Mandyam |
| 2002/0018453 A1 | 2/2002 | Yu et al. |
| 2002/0021682 A1 | 2/2002 | Ariyoshi et al. |
| 2002/0115462 A1* | 8/2002 | Hottinen .................... 455/522 |
| 2002/0147025 A1* | 10/2002 | Savas ......................... 455/522 |
| 2002/0198014 A1* | 12/2002 | Miyamoto et al. .......... 455/522 |
| 2003/0022630 A1 | 1/2003 | Gandhi et al. |
| 2003/0114179 A1* | 6/2003 | Smolyar et al. ............. 455/522 |

\* cited by examiner

POWER CONTROL AVOIDING OUTER LOOP WIND-UP

CLAIM OF PRIORITY UNDER 35 U.S.C. §120

The present Application for Patent is a Divisional of patent application No. 11/264,950 entitled "Power Control Avoiding Outer Loop Wind-Up" filed Nov. 1, 2005, pending, which is a Continuation of patent application Ser. No. 10/067,608 entitled "Power Control Avoiding Outer Loop Wind-Up" filed Feb. 4, 2002, now U.S. Pat. No. 7,010,321 issued Mar. 7, 2006, both of which are assigned to the assignee hereof and hereby expressly incorporated by reference herein.

BACKGROUND

Field

The present invention relates generally to communications, and more specifically to a novel and improved method and apparatus for performing power control while avoiding outer loop wind-up.

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for CDMA2000 Spread Spectrum Systems," the "C.S0005-A Upper Layer (Layer 3) Signaling Standard for CDMA2000 Spread Spectrum Systems," and the "C.S0024 CDMA2000 High Rate Packet Data Air Interface Specification" (the CDMA2000 standard), and (4) some other standards.

Capacity in a CDMA system is constrained by other-user interference. Other-user interference can be mitigated through use of power control. The overall performance of the system, including capacity, voice quality, data transmission rates and throughput, is dependant upon stations transmitting at the lowest power level to sustain the desired level of performance whenever possible. To accomplish this, various power control techniques are known in the art.

One class of techniques includes closed loop power control. Such systems may employ an inner and outer power control loop in the mobile station. An outer loop determines a target received power level according to a received error rate. The outer loop may update the target received power level at a relatively slow rate, such as once per frame or block. In response, the inner loop then sends up and down power control messages to the base station until received power meets the target. These inner loop power control commands occur relatively frequently, so as to quickly adapt the transmitted power to the level necessary for efficient communication.

In some cases, channel conditions may change and prevent the received power from reaching the target received power. This may result from the loop opening, i.e., the base station does not successfully receive the power control messages. Or, the base station may be transmitting at the maximum power available for a particular mobile station, but a deteriorating channel does not allow enough received power to meet the target, and thus the received error rate remains too high. In such a case, the received power may be sufficient to sustain communications, albeit at a higher error rate than that desired. These situations may lead to a condition referred to as wind-up. The outer loop may keep increasing the target received power in an attempt to meet the error rate requirement. The inner loop will continue to send "up" commands in an attempt to raise the received power. The received power may not increase at all, or may increase insufficiently to meet the error rate requirements. The target received power may be increased to a relatively high level, much higher than required prior to the change in channel conditions. When channel conditions subsequently improve, the received power and the error rate improve dramatically, and the error rate is much less than what is required. It can take some time for the outer loop to lower the target received power back down to the appropriate level for the desired error rate, or, in other words, to "unwind".

During the unwinding period, the power transmitted to the mobile station may be unnecessarily high due to the excessive target received power of the outer loop. This can cause undue interference to other users and have deleterious effects on system capacity, throughput, and transmission quality for the other users. There is therefore a need in the art for power control that avoids outer loop wind-up.

SUMMARY

Embodiments disclosed herein address the need for power control that avoids outer loop wind-up. In one aspect, wind-up of a target power level is detected, and the target power level is modified in response. In another aspect, unwinding of the target power level is detected, after which the target power level is determined without considering wind-up. Various other aspects are also presented, including wind-up and unwinding detection procedures, and target power level modification procedures. These aspects have the benefit of reducing the time that transmit power exceeds that which is necessary, thus increasing system capacity and performance, and mitigating misallocation of system resources.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
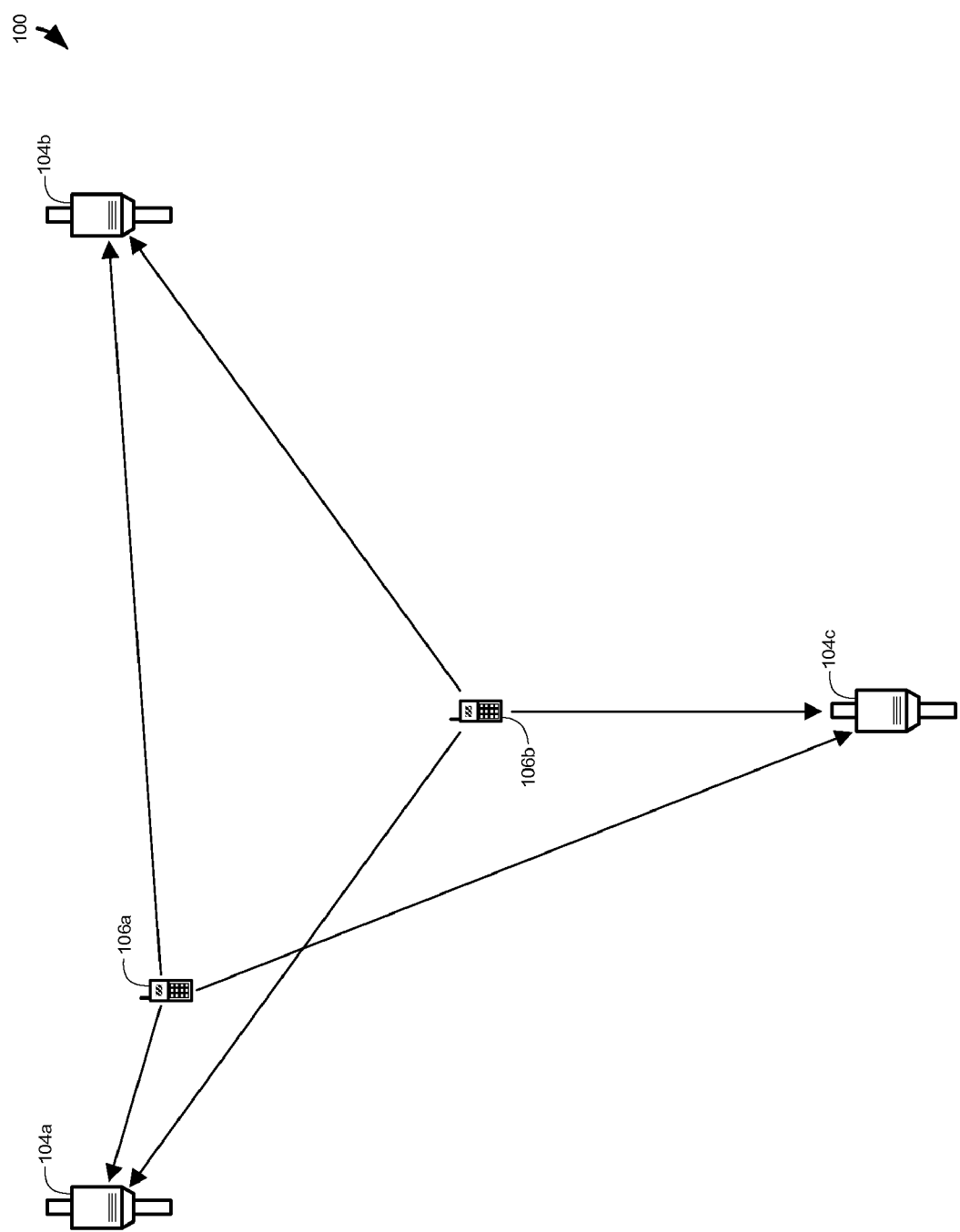
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the CDMA2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station. The communication links shown between base stations 104 and mobile stations 106 may include direct paths as well as paths introduced due to reflections off various obstacles (not shown). In addition, obstacles may block the direct path and a mobile station 106 may communicate with a base station using only reflected signals. The combination of direct and reflected communication signals transmitted between a base station and a mobile station are referred to as a multipath signal, with the multipath signal comprised of various multipath components.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Various power control techniques are known in the art. One class of techniques employs closed-loop power control, in which each mobile station 106 sends power control messages to the base station or stations 104 with which it is communicating. These power control messages indicate whether the base station should increase or decrease the transmission power of the signals directed to the mobile station. The messages are determined in response to error rates within the mobile station. Examples include systems designed such that block error rate, frame error rate, or bit error rates are set to a desired level, such as one or two percent.

The power control messages may be as simple as an up or down command, where the amount of power increased or decreased is pre-determined at some constant value or in accordance with a pre-determined algorithm. When the error rate drops below the desired level, the individual user may benefit from a lower error rate, but the rest of the users in the system and system capacity may suffer because surplus power is being transmitted to the one mobile station at the expense of all the others. So, the mobile station will send "down" commands until the error rate increases to the desired level. If the channel conditions are deteriorating, due to movement of the mobile station, movement of other obstacles in the path between the mobile and base station, or other phenomena, such that the error rate increases beyond the desired level, the mobile station can send "up" commands until the error rate converges to the desired level. In steady state, perhaps when the channel is not changing dramatically, the power control commands may alternate between up and down commands, essentially keeping the transmitted power stable.

Figure 2:
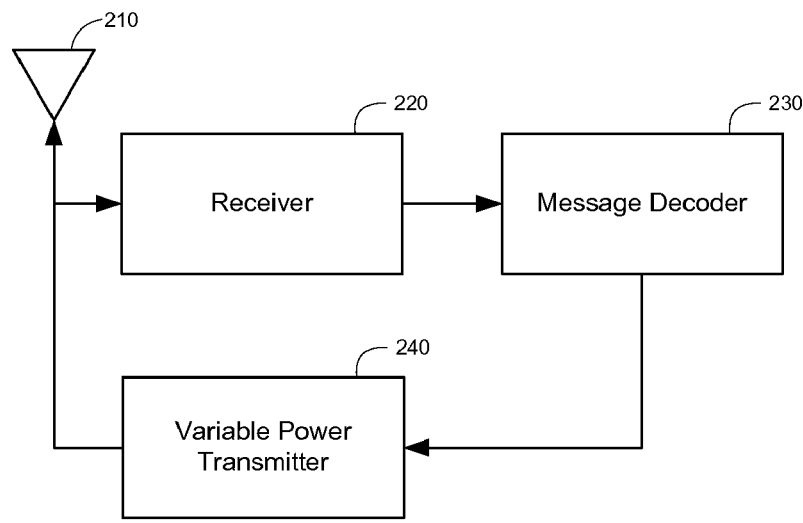
FIG. 2 depicts an exemplary embodiment of a base station.

FIG. 2 depicts an exemplary embodiment of a base station 104. Signals are received via antenna 210 and delivered to receiver 220. Receiver 220 may perform various procedures including radio frequency (RF) to baseband conversion, amplification, filtering, demodulation, deinterleaving, decoding, and the like, techniques for which are known in the art. The data from receiver 220 is delivered to message decoder 230, where various messages are decoded, including power control messages. The power control commands embedded in the power control messages are delivered to variable power transmitter 240, which varies the transmit power for various mobile stations 106 in response to the power control commands received from them. Variable power transmitter 240 then transmits data specified for the mobile stations 106 via antenna 210. The data source for data to be transmitted by variable power transmitter 240 is not shown.

In the exemplary embodiment, a digital signal processor (DSP) or other general-purpose processor is deployed for delivering data for transmission to variable power transmitter 240, as well as for controlling various other communication functions within base station 104. The function of message decoder 230, as well as various parts of receiver 220 may be carried out in a general-purpose processor, special purpose hardware, or a combination of both. Memory or other media may be attached to the processor for carrying out software, firmware, or other instructions to perform the various tasks described herein. Details not shown in FIG. 2.

Figure 3:
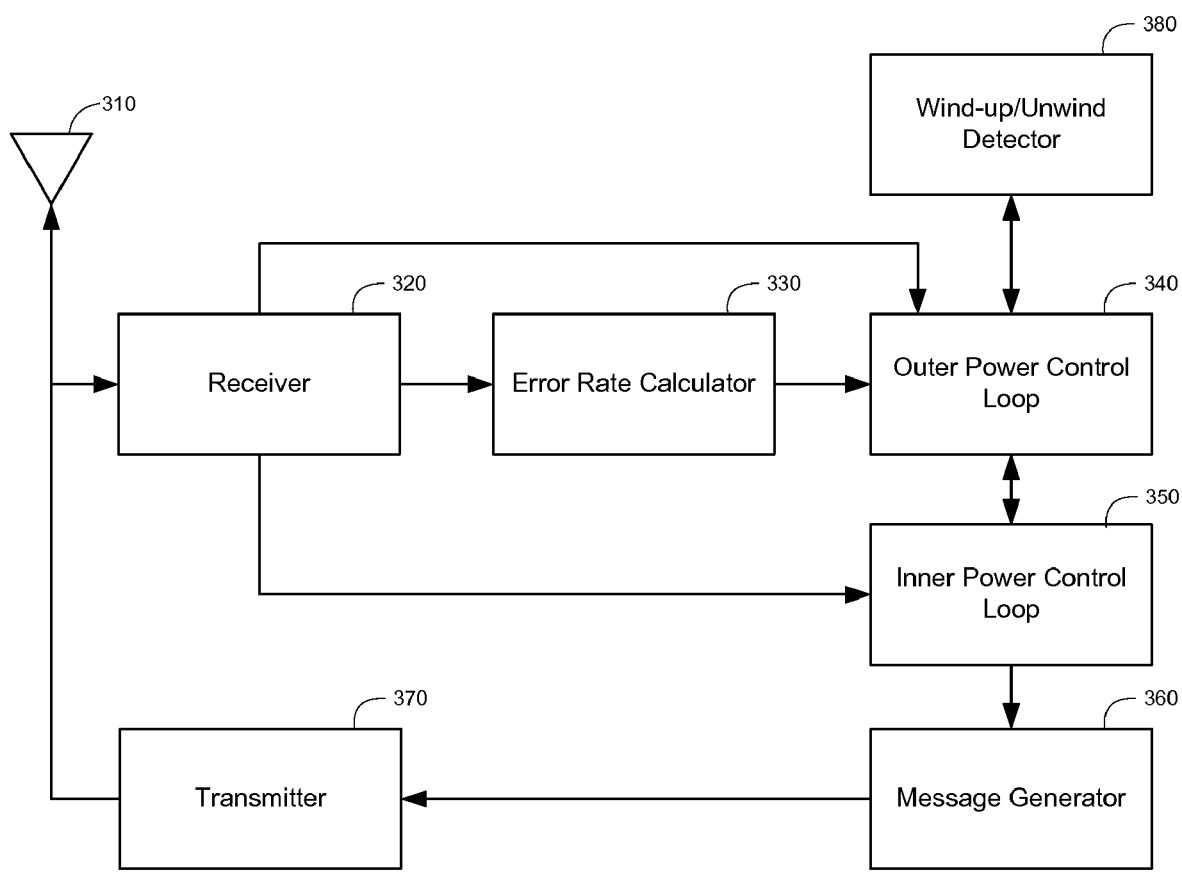
FIG. 3 depicts an exemplary embodiment of a mobile station.

FIG. 3 depicts an exemplary embodiment of a mobile station 106. Signals are received at antenna 310 and delivered to receiver 320. Receiver 320 may perform various procedures including RF-to-baseband conversion, amplification, filtering, demodulation, deinterleaving, decoding, and the like, techniques for which are known in the art. Data from receiver 320 may be converted to audio signals during a voice call, or delivered to a data application (details not shown). Error rate calculator 330 receives information from receiver 320 to determine the current error rate for use in outer power control loop 340. The error rate may be a frame error rate or block error rate. The principles of the present invention apply to any type of error rate that can drive the outer power control loop. Other parameters, measurements, or estimates may also be delivered from receiver 320 to outer power control loop 340 for use in detecting or responding to wind-up, which will be detailed further below.

Outer power control loop 340 sets a target, which correlates with received power. In the exemplary embodiment, outer power control loop 340 sets a target signal-to-interference ratio (SIR), which is delivered to inner power control loop 350. Inner power control loop 350 receives from receiver 320 an estimate or measurement of the received power for comparing with the target set by outer power control loop 340. Alternatively, other information can be delivered to receiver 320 to inner power control loop 350 from which the received power can be calculated. In the exemplary embodiment, a measured SIR is delivered to inner power control loop 350.

Inner power control loop compares the measured SIR from receiver 320 with the target SIR from outer power control loop 340 to determine whether an adjustment needs to be made. Message generator 360 receives the comparison results and generates power control messages. When the measured SIR is lower than the target SIR, an "up" power control message is generated. When the measured SIR is higher than the target SIR, a "down" power control message is generated. In the exemplary embodiment, only up and down messages are generated, and a message is generated once per slot. Thus, in steady state, with perfect estimates of the SIR, the power control messages will alternate between up and down, with the received SIR fluctuating tightly around the target SIR. With non-perfect SIR estimates, the received SIR will fluctuate with some deviation around the target SIR. The power control messages are delivered to transmitter 370 for processing, examples including amplification, modulation, conversion from baseband to RF, and the like, techniques for which are known in the art. The transmitter output is delivered through antenna 310 to a base station 104, which will act on the power control message, as described above with respect to FIG. 2.

In the exemplary embodiment, system 100 is a W-CDMA system. The mobile station (or UE) and base station (or NodeB) attempt to maintain power control using the block error rate (BLER) as the quality metric. The block error rate is a measure of the proportion of blocks received in error, as determined by a cyclic redundancy check (CRC). The target SIR set by the outer loop is updated each block, which consists of 1, 2, 4, or 8 frames consisting of 15 slots per frame. The inner loop generates a power control message once per slot, allowing the transmitted power to quickly adapt to the relatively slower moving target SIR.

The outer power control loop 340 increases the target SIR by an "up step size if a block error is detected, and decreases the target SIR by a "down" step size if no error is detected. Typically, the up step size is much larger than the down step size. Thus, when a block error is received, the target is raised high enough that several subsequent blocks received error free, and the associated down commands that will accompany them, do not bring the transmitted power below the level required for error free transmission until a desired number of error free blocks are received. The ratio of up to down step sizes can be used to tailor a particular block error rate. Thus, error rate calculator 330 in this embodiment may simply generate an error indicator once per block.

Note that the disparity between up and down step sizes in the outer power control loop exacerbates the wind-up problem. After several sequential up commands, which raise the target SIR, it may take many block times to reduce that target SIR. As discussed above, in wind-up conditions, the increase in target SIR does not succeed in bringing the received SIR to the desired level, so that the number of up commands may only be limited by the length of time the mobile station remains obstructed. Once the obstruction is removed, the target SIR is likely to greatly exaggerate the required SIR for communication at the desired error rate. System capacity and performance will suffer while the mobile station unwinds, since excessive power will have been dedicated to the one mobile station.

Figure 4:
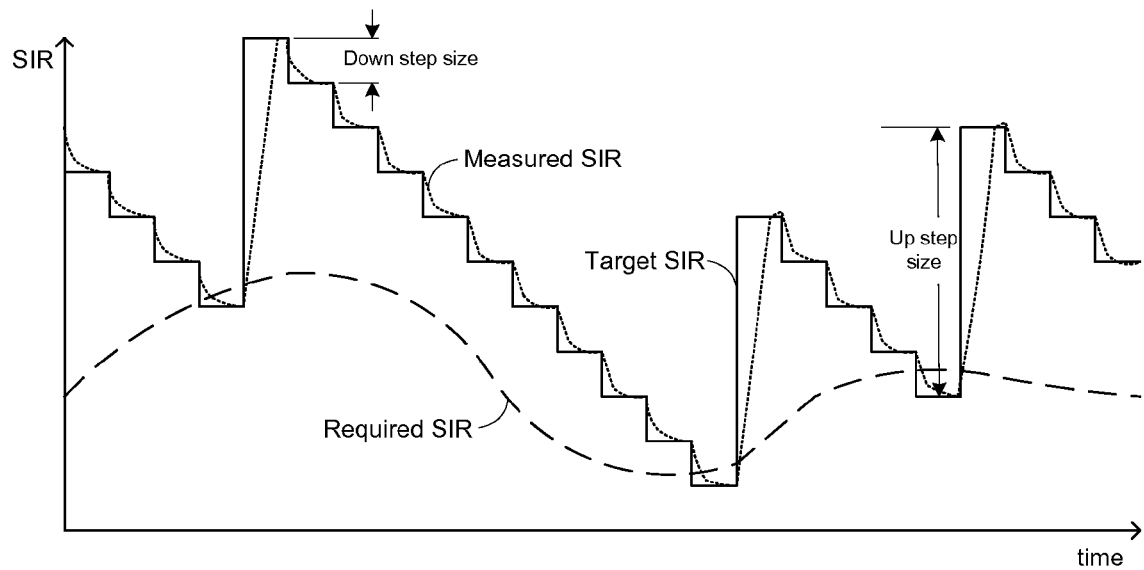
FIG. 4 depicts an idealized graphical representation of the operation of closed loop power control under normal conditions.

FIG. 4 is an idealized graphical representation of the operation of closed loop power control in normal (i.e. not wind-up) conditions. The dashed line labeled "Required SIR" is a theoretical minimum received SIR to meet the desired error rate, or, in the exemplary embodiment, to avoid a block error. The solid line, labeled "Target SIR" is the target SIR set by the outer loop. The dotted line, labeled "Measured SIR" is the estimate of received SIR at the mobile station. During normal operation, received SIR tracks relatively closely with target SIR, in response to up and down power control commands delivered to the base station as a result of the inner loop responding to the target SIR set by the outer loop. Note that each time the target SIR falls below the theoretical required SIR, and in response the measured SIR falls below as well, the error rate increases beyond the desired error rate, and thus the target SIR is raised by the outer loop in response. The target SIR is raised by the "Up step size", as shown. Subsequently, the target and measured SIR is above the required SIR, and the target is then lowered each block by the "Down step size", as shown. This generalized and idealized example demonstrates the operation of the outer and inner power control loops during normal operation.

Figure 5:
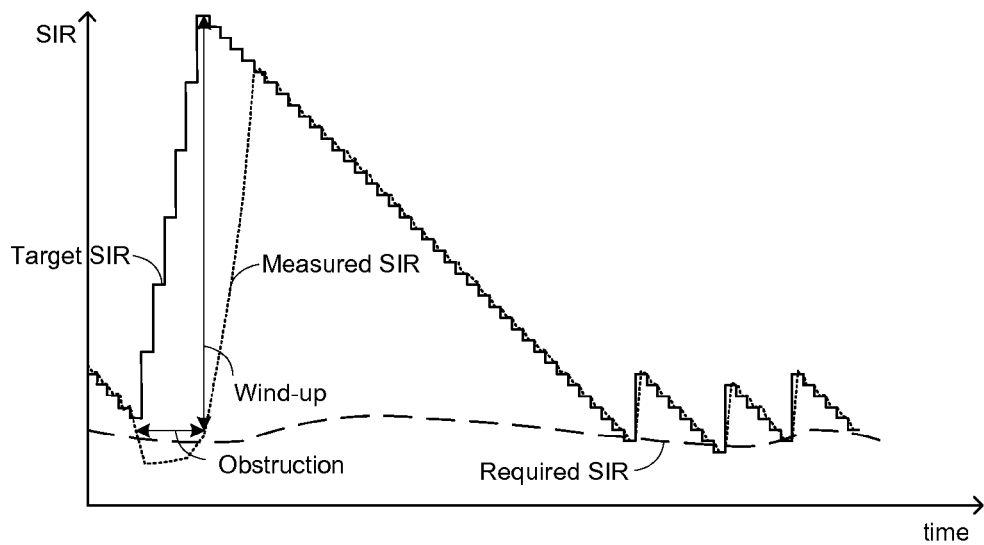
FIG. 5 depicts an idealized graphical representation of the operation of closed loop power control under wind-up conditions.

In contrast, FIG. 5 shows an idealized graphical representation of the operation of closed loop power control during a wind-up. The solid, dashed, and dotted lines correspond to those described in FIG. 4. Note that during a period of time, labeled "Obstruction", the measured SIR no longer tracks the target SIR. As described above, this may be due to the inability of the base station to receive power control commands. Or, the channel may be so deteriorated that increased transmit power does not result in an adequate increase in received power. Or, the base station may not have additional power available for transmission. A combination of these conditions may occur simultaneously. Wind-up, as shown, occurs when the outer loop continually raises the target SIR by the up step size, and the inner loop requests more power, but the received SIR does not increase correspondingly. In the example shown in FIG. 5, the outer loop raises the target SIR six times before the obstruction is cleared, and the received SIR starts to "catch up" to the level requested by the inner loop. Note the relatively long period of time required for decreases in the target SIR by the outer loop to lower the target, and thus the measured SIR. During this unwinding time, the transmit power being allocated to this mobile station is well in excess of the required power, and is therefore a misallocation of system resources.

Referring once again to FIG. 3, a wind-up and/or unwind detector 380 can be connected to outer power control loop 340. Detector 380 can be used to detect the start of wind-up conditions, or the beginning of unwinding following the presence of conditions that could lead to wind-up. Outer power control loop 340 can modify the target power level to avoid wind-up when notified by detector 380. Outer power control loop 340 can continue to set the target power level according to wind-up procedures until unwinding is detected, after which the target can be set according to normal conditions. Detector 380 is shown as a discrete component in FIG. 3 for clarity of discussion only. Those of skill in the art will recognize that detector 380 can be part of outer power control loop 340. Furthermore, some or all the components shown in FIG.

3 can be implemented in a general purpose processor, special purpose hardware, or a combination of both. Various methods for detecting wind-up or unwinding are described below, and can be deployed in embodiments of detector 380. Various methods for modifying the target power level in response to wind-up or unwind detection are also described below, and can be deployed in a mobile station 106 such as described with respect to FIG. 3.

Figure 6:
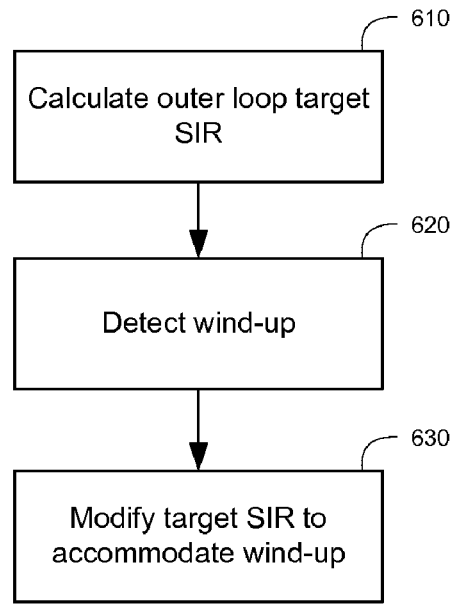
FIG. 6 depicts a flowchart of an embodiment of a method for preventing wind-up in power control.

FIG. 6 depicts a flowchart of an embodiment of a method for preventing wind-up in power control. The steps may be repeated periodically, just as the power control loops run cyclically during a communication session. In step 610, the outer loop calculates the target SIR. In step 620, wind-up detection is performed. In step 630, the target SIR computed in step 610 is modified to accommodate wind-up whenever it is detected in step 620. In general, preventing the target SIR set by the outer loop from reaching wind-up levels will mitigate the effects of wind-up. As stated before, those of skill in the art will recognize that SIR is but one the various power parameters that can be measured, targeted and used for generating closed-loop power control messages. Examples of various techniques for modification of target received power levels as well as detecting wind-up are detailed further below.

Figure 7:
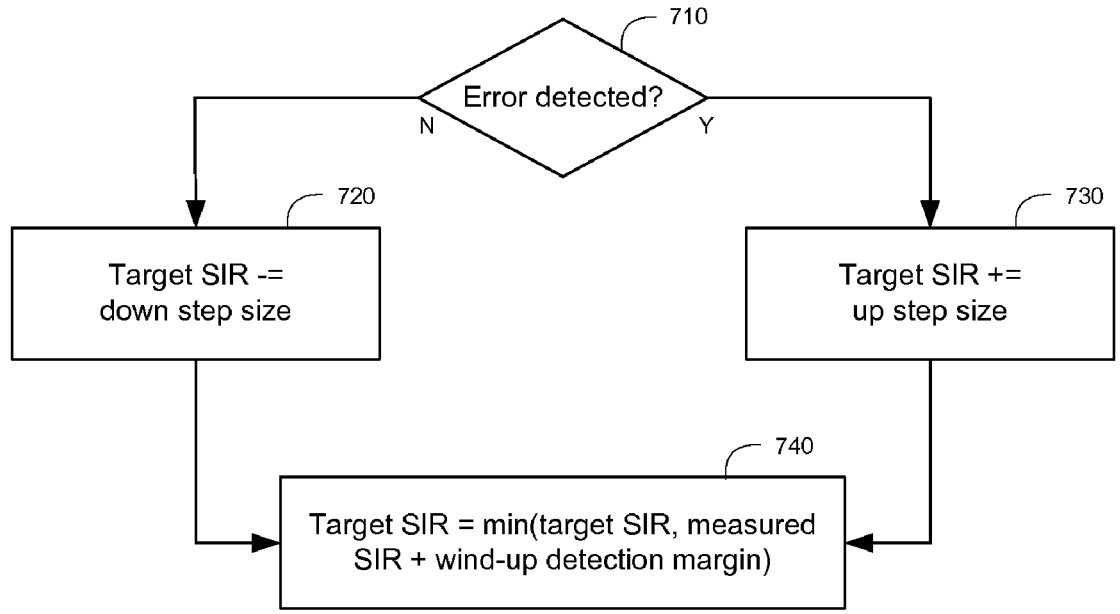
FIG. 7 depicts a flowchart of an alternate embodiment of a method for preventing wind-up in power control.

FIG. 7 is a flowchart of one method of preventing wind-up. This method can be used with the exemplary W-CDMA system described above, as well as other systems. Steps 710-730 correspond to a detailed embodiment of step 610, calculating the outer loop target SIR, described with respect to FIG. 6 above. In decision block 710, if an error is detected, proceed to step 730 to increase the target SIR by the up step size. In this embodiment, a block error is used for the test in decision block 710. In an alternate embodiment, decision block 710 may test for the error rate to exceed a desired error rate to proceed to step 730. If an error is not detected (or the error rate is below the desired level), the target SIR can be lowered by down step size, as shown in step 720.

After either step 720 or 730, the target SIR has been calculated. Proceed to step 740. Step 740, in this embodiment, is a combination of steps 620 and 630, described above. In step 740, the target SIR will be capped with respect to the measured SIR. Assigning the target SIR to be the minimum of itself, unmodified, and the measured SIR added to some predetermined wind-up detection margin carries this out. So, when an increase in target SIR in step 730 results in a target SIR that is less than or equal to the measured SIR plus the wind-up detection margin, then, in a sense, no wind-up is detected. Therefore, no modification is required. On the other hand, when an increase in target SIR in step 730 results in a target SIR that is greater than the measured SIR plus the wind-up detection margin, the mobile station is presumed to have detected wind-up. The modification to the target SIR is to cap it, by assigning it the value of the measured SIR plus the wind-up detection margin.

Figure 8:
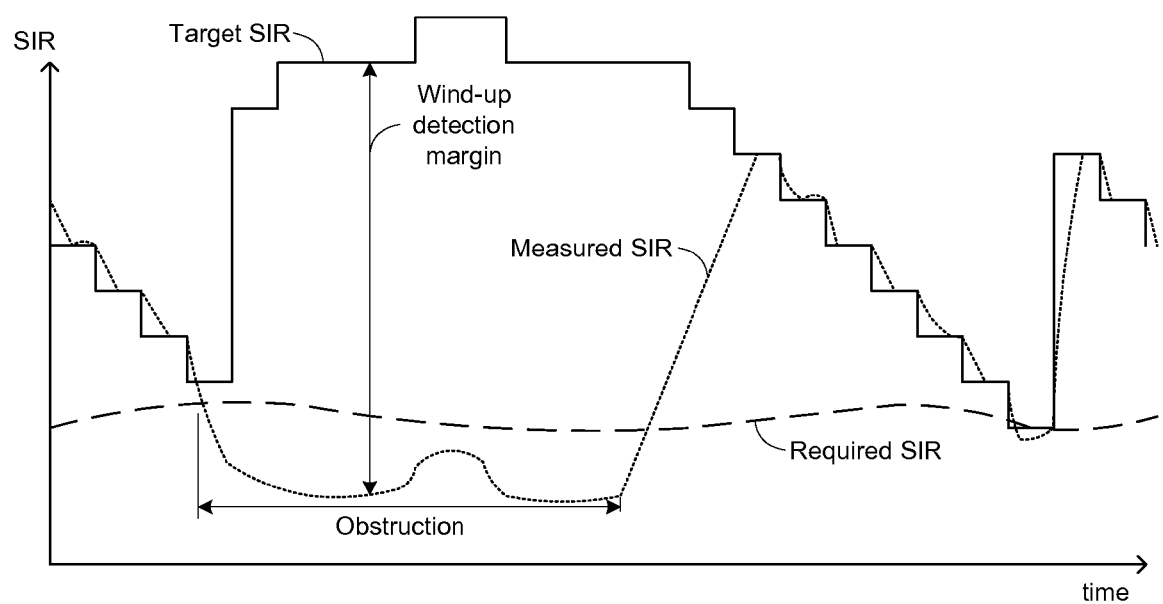
FIG. 8 depicts an idealized graphical representation of the operation of closed loop power control with a method minimizing wind-up.

FIG. 8 depicts an idealized graphical representation of a method, such as that just described with respect to FIG. 7, operating to prevent and/or minimize the effects of wind-up. Note that the solid, dashed and dotted lines correspond to target, required, and measured SIR, respectively, as detailed above with respect to FIGS. 4 and 5. As in FIG. 5, there is a period of time where the measured SIR does not track the target SIR, labeled "Obstruction". When the obstruction occurs, the measured SIR falls below the required SIR, and an error occurs. The outer loop increases the target by the up step size. The measured SIR continues to stay below the required SIR, so the outer loop attempts to raise the target SIR by another up step size. However, in this case, since the resultant target SIR would be greater than the measured SIR plus the "Wind-up detection margin", as shown, the target SIR is capped. Note that while the obstruction remains, the target SIR stays roughly within the wind-up detection margin from the measured SIR. When the obstruction clears, the measured SIR ramps up to track the target, which then begins climbing down to track the required SIR. In this case, wind-up has been prevented (or at least minimized), in that the outer loop never allowed the target SIR to grow as large as it did in the example of FIG. 5. Consequently, when the obstruction cleared, the loops converged more quickly, thus minimizing the time spent with excessive power transmitted from the base station.

The effectiveness of the method of FIG. 7 is somewhat dependent on the accuracy of the power estimate, measured SIR in the exemplary embodiment. The wind-up detection margin can be increased to account for noise in the estimate. However, if the margin is increased too much, then the wind-up prevention is diminished. Alternate modifications to the target SIR can be deployed as well, in addition to the capping method just described. The target SIR can be simply frozen at a certain value once wind-up is detected. Detection of wind-up can use additional parameters, to increase the accuracy of wind-up detection. An exemplary method employing these alternate techniques is depicted in FIG. 9.

Figure 9:
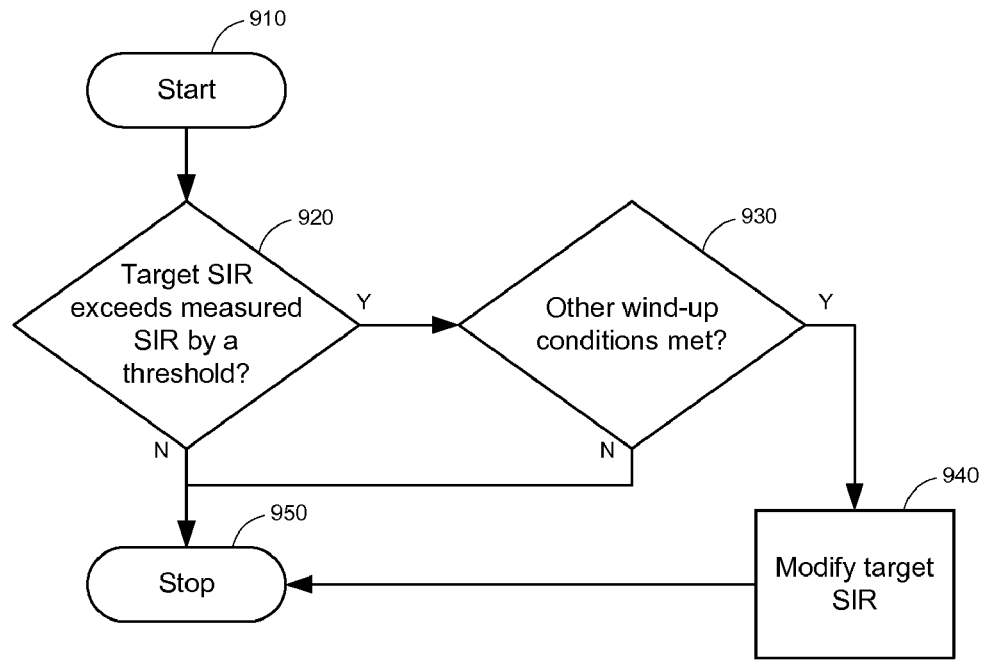
FIG. 9 shows an alternate method for detecting wind-up and modifying the target power level in response.

FIG. 9 shows an alternate method for detecting wind-up and modifying the target SIR in response. Steps 910-950 can be substituted for steps 620 and 630 in the procedure of FIG. 6. The procedure starts in start block 910, then proceeds to decision block 920. If the target SIR exceeds the measured SIR by a threshold, then proceed to decision block 930. If the threshold is not exceeded, wind-up is not detected, proceed to stop block 950. In decision block 930, additional wind-up conditions are tested to verify that exceeding the threshold in decision block 920 is more likely to be wind-up, and not a noisy estimate or other phenomenon. The other conditions can be selected that are not highly correlated with the measured SIR. Examples include estimating the power directed specifically to the mobile station (as opposed to the more general signal-to-interference ratio), short-term frame or block error, and the like. In the exemplary embodiment, the dedicated physical channel energy per chip over interference (DPCH Ec/Ior) can be tested against a threshold as an alternate condition for detecting wind-up. The threshold in decision block 920 can be similar to the wind-up detection margin of FIG. 7, but can also be tailored to account for the additional conditions of decision block 930. If, in decision block 930, the other wind-up conditions have not been met, wind-up is not detected, proceed to stop block 950.

If both tests in decision blocks 920 and 930 have been met, then wind-up is detected. Proceed to block 940 to modify the target SIR. As before, the target SIR can be modified by capping it with some margin over the measured SIR, or can be frozen at a particular level, such that it is not a function of SIR. Various other options are contemplated, some of which are detailed further below.

It can be seen that the method of FIG. 7, which capped target SIR as a function of measured SIR, is a specific embodiment of the more general method described with respect to FIG. 9. The method of FIG. 9 generalized the test for detecting wind-up, and called out a variety of ways for modifying target SIR when wind-up is detected. These methods can be extended further by introducing hysteresis, whereby in normal mode the outer loop performs in one fashion, and in wind-up mode the outer loop performs in another fashion tailored to ameliorate the effects of wind-up. The conditions for transitioning from normal mode to wind-up mode can be specified, i.e. wind-up detection conditions.

A different set of conditions can be specified for transitioning from wind-up mode to normal mode, i.e. unwind detection conditions.

Figure 10:
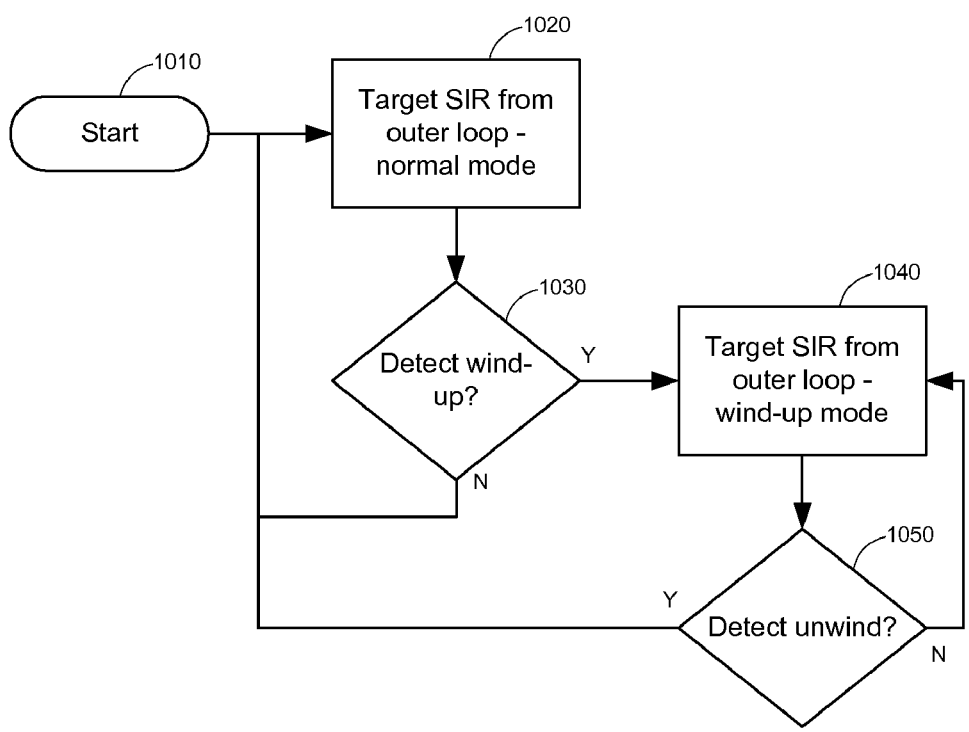
FIG. 10 shows a method for detecting wind-up and modifying the target power level using hysteresis.

FIG. 10 depicts an exemplary embodiment of a method for avoiding wind-up with hysteresis. The process begins in start block 1010, and then proceeds to the normal state, which is the initial state in this embodiment. The wind-up state could also be selected for the initial state. Normal state, in this embodiment, is captured in steps 1020-1030. Wind-up state is captured in steps 1040-1050. From start block 1010, proceed to block 1020, where the target SIR is determined in the outer loop in normal fashion. (In an alternate embodiment, as discussed above, the outer loop may use another parameter instead of SIR to drive the inner loop, and thus close the power control loop with the base station.) In the exemplary embodiment, a block error results in an increase of up step size in target SIR. No block error results in a decrease of down step size in target SIR. Other embodiments may use an error rate, such as determined in error rate calculator 330. Any of the various power control techniques can be adapted for use in the normal mode of the outer loop. Once the target SIR is determined, proceed to decision block 1030 to detect wind-up. Note that steps 1020 and 1030 may operate in parallel, or decision block 1030 may be called prior to step 1020. If wind-up is not detected, proceed back to step 1020 to perform the next iteration of the outer loop. Wind-up detection may occur in a wind-up/unwind detector 380.

If, in decision block 1030, wind-up is detected, proceed to step 1040 to calculate the target SIR using the procedures defined for wind-up mode. This may entail modifying the result calculated in step 1020, or a new SIR may be calculated. Proceed to decision block 1050. If unwinding is detected, return to normal mode via block 1020. If unwinding is not yet occurring, return to step 1040 to perform the next iteration of the outer loop, using the wind-up target SIR calculating procedures. Note that steps 1040 and 1050 may occur in the opposite order shown, or in parallel. Unwind detection may occur in a wind-up/unwind detector 380.

In the foregoing discussion, various tests for detecting wind-up for use in steps 620, 740, 920-930, and 1030 have been discussed. Similar tests can be deployed for detecting unwinding, such as in step 1050, although the test for detecting wind-up need not be identical to the test for unwinding. Following are five exemplary conditions that can be checked to detect wind-up and unwinding, some of which have been discussed above.

First, the measured SIR can be added to or multiplied by a parameter 6 and the result compared with the outer loop target SIR. Second, the measured SIR can be filtered, then multiplied by or added to 6 and the result compared with the outer loop target SIR. Third, the block error rate (or frame error rate) can be measured over a pre-determined interval and compared with a block or frame error threshold. Fourth, the inner loop power control commands can be used to indicate the likelihood of wind-up or unwinding. For example, the number of up commands over a certain number of slots or the number of down commands over a certain number of slots can be compared with a threshold. Fifth, the downlink traffic to pilot ratio can be measured. The current ratio over a certain number of slots divided by the previous ratio can be compared with a threshold.

Various design parameters in each of these five tests have been identified. The tests can be combined. Unwinding tests and wind-up tests can use similar or different conditions with similar or different design parameters. These five tests for detecting wind-up or unwinding can be used throughout the various embodiments disclosed herein. These five tests serve as examples only, and various other tests can be deployed in the wind-up or unwind tests described.

A variety of procedures for modifying the outer loop SIR target during wind-up have been described with respect to the embodiments described above. For example, steps 630, 740, 940, and 1040 are all used within their respective embodiments to alter the outer loop SIR target. Following are five such exemplary modifying procedures, some of which have been described above.

First, the target SIR may be capped as some function of measured SIR. Various functions can be used and will be recognized by those of skill in the art. Second, the target SIR can be frozen at a pre-determined level until unwinding is detected. These two target SIR modifications have been described previously.

Third, the normal outer loop up and down step sizes can be modified. For example, if the CRC (or other error or error rate test) passes, decrease the target SIR by $\delta_{pass}$. If the CRC (or other error or error rate test) fails, decrease the target SIR by $\delta_{fail}$. In one embodiment, $\delta_{pass} \gg \delta_{fail}$, such that the target is decreased much faster when it passes than when it fails. In both cases the target SIR is decreased. The rationale for making this design choice in an embodiment is that if wind-up is detected, it is expected that the target SIR is above the maximum SIR that will be delivered to the mobile (and perhaps indicated by the measured SIR). So, the target SIR is allowed to drift down towards this maximum during the period of elevated errors or error rates. Therefore, the target SIR will be close to the deliverable SIR when unwinding is detected and normal operation resumes. On the other hand, if the CRC (or other error test) passes, it is likely that whatever obstruction or interference that caused wind-up to be detected is no longer interfering. In this case, it is beneficial to quickly ramp down the target SIR to keep the transmitted power to the mobile station as close to optimal as possible.

Fourth, a different set of outer loop up and down step sizes can be used when in wind-up mode, in conjunction with a relatively higher target error rate than the target rate used in normal mode. As an example, refer again to FIG. 8. During the period of time in which the obstruction is causing a reduced measured SIR, the received SIR is less than the required SIR to achieve the target error rate. This is precisely the condition that would lead to outer loop wind-up without one of the wind-up prevention procedures described herein. However, in some cases, the received SIR may be sufficient to carry on communications at an elevated error rate compared to the normal desired error rate. Using this wind-up target error rate may allow the outer loop to converge to the higher error rate and function "normally", although it may be desirable to use a different set of up and down step sizes in this mode.

Fifth, the "slew rate" of increasing target SIR can be limited. In other words, the number of increases within a certain period may be limited to some maximum. This prevents the target SIR from rising at the maximum slope determined by the up step size for an extended period. Various effective slew rates can be achieved by modifying the maximum number per period, or the length of the period. As an example, one limitation may be to limit the number of increases to 5 within 100 frames. Those of skill in the art will recognize the myriad combinations possible, These five modification procedures, just described, are examples of the type of modifications that can be made to the target SIR to control wind-up. (Those of skill in the art will readily apply the principles described herein to power control loops using measurements and targets other than SIR.) Any one of these, or combinations thereof, in certain circumstances, can be applied to the various method embodiments disclosed herein. Other outer loop SIR modifications can be contemplated, and fall within the scope of the present invention.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A. method of power control comprising:
sending power control commands to adjust a transmit power of a remote station, the power control commands based on a target power parameter;
detecting a condition wherein a measured power parameter does not track the target power parameter in response to a sent power control command, wherein detecting the condition comprises comparing the target power parameter with a filtered measured power parameter;
operating an outer power control loop according to one of a normal mode or a wind-up mode based on whether the condition is detected; and
modifying the target power parameter when the condition is detected.

2. A method comprising:
sending power control commands to adjust a transmit power of a remote station, the power control commands based on an outer loop target;
during a normal state, setting the outer loop target according to a normal outer loop power control scheme, detecting a wind-up condition in response to a sent power control command, and, upon such detection, exiting the normal state and entering a wind-up state; and
during the wind-up state, setting the outer loop target according to a wind-up scheme;
the detecting the wind-up condition comprising determining if the outer loop target exceeds a measured signal-to-interference ratio by a threshold.

3. The method of claim 2, further comprising filtering the measured signal-to-interference ratio before determining if the outer loop target exceeds a measured signal-to-interference ratio by a threshold.

4. The method of claim 2, wherein setting the outer loop target according to the wind-up scheme comprises capping a target Signal to Interference Ratio (SIR) as a function of a measured SIR value.

5. The method of claim 2, wherein setting the outer loop target according to the wind-up scheme comprises freezing a. target Signal to Interference Ratio (SIR) to a pre-determined level.

6. The method of claim 2, wherein setting the outer loop target according to the wind-up scheme comprises modifying a step size associated with a power control command relative to a step size in the normal state.

7. The method of claim 6, further comprising setting a higher target error rate than is used in the normal state.

8. The method of claim 2, wherein setting the outer loop target according to the wind-up scheme comprises limiting a slew rate of changes to the outer rate target.

9. The method of claim 2, further comprising detecting an unwind state when in the wind-up state and exiting the wind-up state and returning to the normal state.

10. A method comprising:
sending power control commands to adjust a transmit power of a remote station, the power control commands based on an outer loop target;
during a normal state, setting the outer loop target according to a normal outer loop power control scheme, detecting a wind-up condition in response to a sent power control command, and, upon such detection, exiting the normal state and entering a wind-up state; and during the wind-up state, setting the outer loop, target according to a wind-up scheme;
the detecting the wind-up condition comprising testing, against a threshold, a received energy per chip over interference ratio.

11. A method comprising:
sending power control commands to adjust a transmit power of a remote station, the power control commands based on an outer loop target;
during a normal state, setting the outer loop target according to a normal outer loop power control scheme, detecting a wind-up condition in response to a sent power control command, and, upon such detection, exiting the normal state and entering a wind-up state; and
during the wind-up state, setting the outer loop target according to a wind-up scheme;
the wind-up scheme comprising decreasing the outer loop target by a first step size when a frame is incorrectly received, and decreasing the outer loop target by a second step size when a frame is correctly received, the second step size being larger than the first step size.

12. A method comprising:
sending power control commands to adjust a transmit power of a remote station, the power control commands based on an outer loop target;
during a normal state, setting the outer loop target according to a normal outer loop power control scheme, detecting a wind-up condition in response to a sent power control command, and, upon such detection, exiting the normal state and entering a wind-up state; and
during the wind-up state, setting the outer loop target according to a wind-up scheme;
the normal outer loop power control scheme comprising increasing the outer loop target by a first step size when a frame is incorrectly received, and decreasing the outer loop target by a second step size when a frame is correctly received;
the wind-up scheme comprising increasing the outer loop target by a third step size when a frame is incorrectly received, and decreasing the outer loop target by a fourth step size when a frame is correctly received, the ratio of the third step size to the fourth step size being larger than the ratio of the first step size to the second step size.

13. A wireless communication device, operable with a second wireless communication device to perform closed-loop power control, comprising:
a wind-up detector for detecting wind-up of a target power level;
an outer loop power control loop for generating a target power level according to one of a normal mode or a wind-up mode and modifying the target power level in response to wind-up detection in the wind-up detector,
the wind-up detection comprising measuring an error rate over a predetermined period and comparing the error rate with an error rate threshold.

14. A wireless communication device, operable with a second wireless communication device to perform closed-loop power control, comprising:
a wind-up detector for detecting wind-up of a target power level; an outer loop power control loop for generating a target power level and modifying it according to a wind-up scheme in response to wind-up detection in the wind-up detector;
the wind-up scheme comprising decreasing the outer loop set-point by a first step size when a frame is incorrectly received, and decreasing the outer loop set-point by a second step size when a frame is correctly received, the second step size being larger than the first step size.

15. A wireless communication device, operable with a second wireless communication device to perform closed-loop power control, comprising:
a wind-up detector for detecting wind-up of a target power level;
an outer loop power control loop for generating a target power level according to a normal outer loop power control scheme, and modifying the target power level according to a wind-up scheme in response to wind-up detection in the wind-up detector;
the normal outer loop power control scheme comprising increasing the outer loop target by a first step size when a frame is incorrectly received, and decreasing. the outer loop target by a second step size when a frame is correctly received;
the wind-up scheme comprising increasing the outer loop set-point by a third step size when a frame is incorrectly received, and decreasing the outer loop set-point by a fourth step size when a frame is correctly received, the ratio of the third step size to the fourth step size being larger than the ratio of the first step size to the second step size.

16. A communication system comprising:
a wind-up detector for detecting wind-up of a target power level;
an outer loop power control loop for generating a target power level according to one of a normal mode or a wind-un mode, and modifying it in response to wind-up detection in the wind-up detector;
the wind-up detection comprising measuring an error rate over a predetermined period and comparing the error rate with an error rate threshold.

17. A communication system comprising:
a wind-up detector for detecting wind-up of a target power level;
an outer loop power control loop for generating a target power level according to one of a normal mode or a wind-up mode, and modifying it in response to wind-up detection in the wind-up detector;
the wind-up detection comprising measuring a Signal to Interference Ratio (SIR) and comparing a sum of the measured SIR with a wind-up detection margin to a target SIR.

18. A computer program product including a computer readable medium having instructions for causing a computer to:
send power control commands to adjust a transmit power of a remote station, the power control commands based on a target power parameter;
detect a condition wherein a measured power parameter does not track the target power parameter in response to a sent power control command;
operate an outer power control loon according to one of a normal mode or a wind-up mode based on whether the condition is detected; and
modify the target power parameter when the condition is detected, wherein the causing the computer to detect the condition comprises causing the computer to measure an error rate over a predetermined period and to compare the error rate with an error rate threshold.

19. A computer program product including a computer readable medium having instructions for causing a computer to:

send power control commands to adjust a transmit power of a remote station, the power control commands based on a target power level;

detect a wind-up condition; and limit a power control slew rate in the wind-up condition to limit number of target power level increases to a predetermined maximum number within a period of predetermined length.

20. A communication system comprising:

means for sending power control commands to adjust a transmit power of a remote station, the power control commands based on an outer loop target;

means for setting the outer loop target, during a normal state, according to a normal outer loop power control scheme;

means for detecting a wind-up condition in response to a sent power control command, and, upon such detection, exiting the normal state and entering a wind-up state; and means for setting the outer loop target, during the wind-up state, according to a wind-up scheme;

the means for detecting the wind-up condition comprising means for determining if the outer loop target exceeds a measured signal-to-interference ratio by a threshold.

21. A communication system comprising:

means for sending power control commands to adjust a transmit power of a remote station, the power control commands based on an outer loop target;

means for setting the outer loop target, during a normal state, according to a normal outer loop power control scheme;

means for detecting a wind-up condition in response to a sent power control command, and, upon such detection, exiting the normal state and entering a wind-up state; and means for setting the outer loop target, during the wind-up state, according to a wind-up scheme;

the means for detecting the wind-up condition comprising means for testing, against a threshold, a received energy per chip over interference ratio.

22. A communication system comprising:

means for sending power control commands to adjust a transmit power of a remote station, the power control commands based on an outer loop target;

means for setting the outer loop target, during a normal state, according to a normal outer loop power control scheme;

means for detecting a wind-up condition in response to a sent power control command, and, upon such detection, exiting the normal state and entering a wind-up state; and means for setting the outer loop target, during the wind-up state, according to a wind-up scheme;

the wind-up scheme comprising decreasing the outer loop target by a first step size when a frame is incorrectly received, and decreasing the outer loop target by a second step size when a frame is correctly received, the second step size being larger than the first step size.

23. A communication system comprising:

means for sending power control commands to adjust a transmit power of a remote station, the power control commands based on an outer loop target;

means for setting the outer loop target, during a normal state, according to a normal outer loop power control scheme;

means for detecting a wind-up condition in response to a sent power control command, and, upon such detection, exiting the normal state and entering a wind-up state; and means for setting the outer loop target, during the wind-up state, according to a wind-up scheme;

the normal outer loop power control scheme comprising increasing the outer loop target by a first step size when a frame is incorrectly received, and decreasing the outer loop target by a second step size when a frame is correctly received;

the wind-up scheme comprising increasing the outer loop target by a third step size when a frame is incorrectly received, and decreasing the outer loop target by a fourth step size when a frame is correctly received, the ratio of the third step size to the fourth step size being larger than the ratio of the first step size to the second step size.

24. A computer program product including a computer readable medium having instructions for causing a computer to:

send power control commands to adjust a transmit power of a remote station, the power control commands based on an outer loop target;

during a normal state, set the outer loop target according to a normal outer loop power control scheme, detect a wind-up condition in response to a sent power control command, and, upon such detection, exit the normal state and enter a wind-up state; and during the wind-up state, set the outer loop target according to a wind-up scheme;

wherein detecting the wind-up condition comprises determining if the outer loop target exceeds a measured signal-to-interference ratio by a threshold.

25. A computer program product including a computer readable medium having instructions for causing a computer to:

send power control commands to adjust a transmit power of a remote station, the power control commands based on an outer loop target;

during a normal state, set the outer loop target according to a normal outer loop power control scheme, detect a wind-up condition in response to a sent power control command, and, upon such detection, exit the normal state and entering a wind-up state; and during the wind-up state, set the outer loop target according to a wind-up scheme;

wherein detecting the wind-up condition comprises testing, against a threshold, a received energy per chip over interference ratio.

26. A computer program product including a computer readable medium having instructions for causing a computer to:

send power control commands to adjust a transmit power of a remote station, the power control commands based on an outer loop target;

during a normal state, set the outer loop target according to a normal outer loop power control scheme, detect a wind-up condition in response to a sent power control command, and, upon such detection, exit the normal state and entering a wind-up state; and during the wind-up state, set the outer loop target according to a wind-up scheme;

the wind-up scheme comprising decreasing the outer loop target by a first step size when a frame is incorrectly received, and decreasing the outer loop target by a second step size when a frame is correctly received, the second step size being larger than the first step size.

27. A computer program product including a computer readable medium having instructions for causing a computer to:
- send power control commands to adjust a transmit power of a remote station, the power control commands based on an outer loop target;
- during a normal state, set the outer loop target according to a normal outer loop power control scheme, detect a wind-up condition in response to a sent power control command, and, upon such detection, exit the normal state and entering a wind-up state; and
- during the wind-up state, set the outer loop target according to a wind-up scheme;
- the normal outer loop power control scheme comprising increasing the outer loop target by a first step size when a frame is incorrectly received, and decreasing the outer loop target by a second step size when a frame is correctly received;
- the wind-up scheme comprising increasing the outer loop target by a third step size when a frame is incorrectly received, and decreasing the outer loop target by a fourth step size when a frame is correctly received, the ratio of the third step size to the fourth step size being larger than the ratio of the first step size to the second step size.

* * * * *